United States Patent

Chen et al.

[11] Patent Number: 5,933,652
[45] Date of Patent: Aug. 3, 1999

[54] HOST INDEPENDENT PERIPHERAL CONTROLLER WITH ON-BOARD FIRMWARE

[75] Inventors: Karl C. Chen, San Jose; Dean T. Huang, Palo Alto, both of Calif.

[73] Assignee: Advanced System Products, Inc., San Jose, Calif.

[21] Appl. No.: 08/706,417

[22] Filed: Aug. 30, 1996

[51] Int. Cl.⁶ .................................................. G06F 11/34
[52] U.S. Cl. ............................................................ 395/821
[58] Field of Search ................................. 395/821, 858, 395/735, 500

[56] References Cited

U.S. PATENT DOCUMENTS

| | | | |
|---|---|---|---|
| 4,589,063 | 5/1986 | Shah et al. | 395/828 |
| 5,179,666 | 1/1993 | Rimmer et al. | 395/882 |
| 5,287,460 | 2/1994 | Olsen et al. | 395/500 |
| 5,586,268 | 12/1996 | Chen et al. | 395/858 |
| 5,668,957 | 9/1997 | Davis et al. | 395/500 |
| 5,682,550 | 10/1997 | Brown et al. | 395/830 |

*Primary Examiner*—Robert W. Beausoliel, Jr.
*Assistant Examiner*—Pierre E. Elisca
*Attorney, Agent, or Firm*—Gerald B. Rosenberg

[57] ABSTRACT

A particular, appropriate BIOS extension image is selected from a potential set of multiple images for use in initializing a peripheral adapter. To enable proper selection, the peripheral adapter includes a firmware image of a BIOS extension that is storable on the peripheral adapter. The firmware image includes a nominal identifier of a BIOS extension and a set of one or more firmware markers that are compliant with the valid identification of the BIOS extension by a first predetermined host computer and that ensures that the firmware image is identifiable by a second predetermined host computer as being invalid. By specific selection of the firmware markers, these markers can be used to uniquely enable a predetermined one of the host processors to appropriately execute an appropriate BIOS extension image.

8 Claims, 3 Drawing Sheets

HOST INDEPENDENT PERIPHERAL CONTROLLER WITH ON-BOARD FIRMWARE

FIELD OF THE INVENTION

The present invention is generally related to peripheral adapters as used in personal computer and workstation computer systems and, in particular, to peripheral adapters with onboard initialization firmware that are desirably and potentially operable in computer systems having substantially different host-processors.

BACKGROUND OF THE INVENTION

Cost and flexibility of use have and will likely continue to be driving factors in the design and construction of personal computers and related computer workstations. As at least one result, peripheral interconnect buses used to support variable configurations of peripheral adapters are being used across wide categories of computer system and workstation platforms. In many cases, these platforms utilize host processors of fundamentally different processor families. By adopting peripheral interconnect buses such as the personal computer interface (PCI) bus, peripheral adapters are usable in a wider variety and larger installed base of platforms. Cost of design, manufacture, and support of a smaller set of peripheral adapters for a wider base of potential applications reduces not only the direct cost of the peripheral adapters on a per unit basis but also reduces the complexity and time necessary to provide support to end-users of such peripheral adapters.

A significant problem remains, however, in that the ready cross-platform use of peripheral adapters directly complicates use of firmware based initialization and operating interface software. Such firmware is typically referred to as a BIOS (basic I/O system) extension that implements a physical layer of programming used by the mainboard BIOS to functionally integrate a peripheral adaptor into a particular platform. This firmware is typically presented as machine language code and is, therefore, specific to the execution capabilities of a particular processor or closely related family of processors. In general, the host processor utilizes the mainboard BIOS of a specific platform to find, validate, and execute the initialization routines of the peripheral adaptor BIOS extension.

A problem in allowing the use of a peripheral adaptor in substantially different processor-based platforms is that the erroneous execution of a BIOS extension for another processor type will fail and likely compromise the operation of the platform. This problem has been overcome in the past by tailoring individual peripheral adapters with single-processor specific BIOS extensions and, as needed, hardware modifications to customize the adaptor for a particular processor or processor family. Inventories, accounting, and support for each different firmware variant of a peripheral adaptor must be tracked and managed. The cost associated with this is substantial not only for the peripheral adaptor manufacturer, but also for system integrators who construct and sell complete platforms. Where the end-user is in effect the system integrator, a substantially greater level of technical understanding is required to properly identify and specify the correct peripheral adaptor for the users' specific platform configuration.

Alternatives have been suggested and, in a few instances, implemented. One such solution has been proposed as IEEE standard 1275-1994, known as the Open BIOS specification. This standard contemplates the use of a high level interpreted language, such as Forth, for implementation of the BIOS extension firmware. Such high level language BIOS extensions require a Forth interpreter to be resident in or as an adjunct to the mainboard BIOS. Whatever Forth program is stored as the BIOS extension must generally be executable by the Forth interpreters actually implemented with the mainboard BIOSs of every different processor mainboard.

Although the Open Boot specification has been apparently available since 1994, very few systems have implemented compatible firmware BIOS extensions. Certainly, all present legacy platforms cannot be field upgradable to take advantage of the Open Boot standard.

Another alternative is to deliver the peripheral adaptor with multiple BIOS extension images in the onboard firmware. Selection of a particular image for use as the BIOS extension for a particular processor must still be resolved particularly for legacy platforms. Existing standardized peripheral interchange buses, such as PCI, do not make provision for identifying the type or family of mainboard processor either physically or electrically at the physical bus level. Consequently, there is no known method of ensuring the correct selection of a BIOS extension image without some if not significant hardware support implemented directly on the peripheral adaptor. Some determinations of processor type have been attempted utilizing bus electrical signatures or the like, but with little success. A greater degree of success has been achieved by the use of a manually placed jumper that explicitly selects a single BIOS extension image for use.

Both of these solutions, to the extent that they are effective at all, require significantly complex hardware to detect processor type or substantial manufacturer, OEM, and end-user support to broadly ensure that any manually placed jumpers are correctly used. In the former instance, bus electrical characteristics and other potentially distinguishing characteristics can be greatly obscured by the many different implementations of processor mainboards. In the latter instance, particularly where the peripheral adaptor is primarily intended for use as a field upgrade or end-user add-on, a substantial amount of end-user support is required in practice to maintain good end-user relations and ensure that jumpers are manually positioned correctly for the particular processor type or family of the user's mainboard.

SUMMARY OF THE INVENTION

Thus, a general purpose of the present invention is to provide a host processor independent system and method of preemptively selecting a correct BIOS extension image to be used with a specific instance of a processor mainboard, thereby allowing a common peripheral adaptor to be used with multiple different processor types in many different platforms.

This is accomplished in the present invention by selecting a particular BIOS extension image for use in initializing a peripheral adapter. To enable proper selection, the peripheral adapter includes a firmware image of a BIOS extension that is storable on the peripheral adapter. The firmware image includes a nominal identifier of a BIOS extension and a set of one or more firmware markers that are compliant with the valid identification of the BIOS extension by a first predetermined host computer and that ensures that the firmware image is identifiable by a second predetermined host computer as being invalid. By specific selection of the firmware markers, the firmware markers can be used exclusively to uniquely select a specific BIOS extension image that is properly executable by a particular processor.

An advantage of the present invention is that a common peripheral adaptor can be utilized in a wide variety of computer platforms that host different processors. In effect, a peripheral adapter in accordance with the present can be used independent of the host processor type.

Another advantage of the present invention is that legacy computer platforms for at least two existing primary processor types can be made to preemptively identify and thereby utilize a correct BIOS extension image.

A further advantage of the present invention is that multiple levels of safeguards are provided by the present invention to ensure that only the correct BIOS extension image is utilized by any particular computer platform.

Still another advantage of the present invention is that the preemptive detection of the proper BIOS extension image is performed reliably in software, thereby substantially reducing the expense of manufacturing multiple variants of the peripheral adaptor, providing hardware assistance to select a specific BIOS extension image for use, and direct support of end-users in properly configuring a peripheral adaptor for their particular computer platform. A peripheral adapter constructed in accordance with the present invention does not require use of any jumpers or custom circuitry to enable selection of a correct image to use.

Yet another advantage of the present invention is that it allows proper BIOS extension image selection for both legacy as well as future computer systems, workstations, and processor types.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

Figure 1:
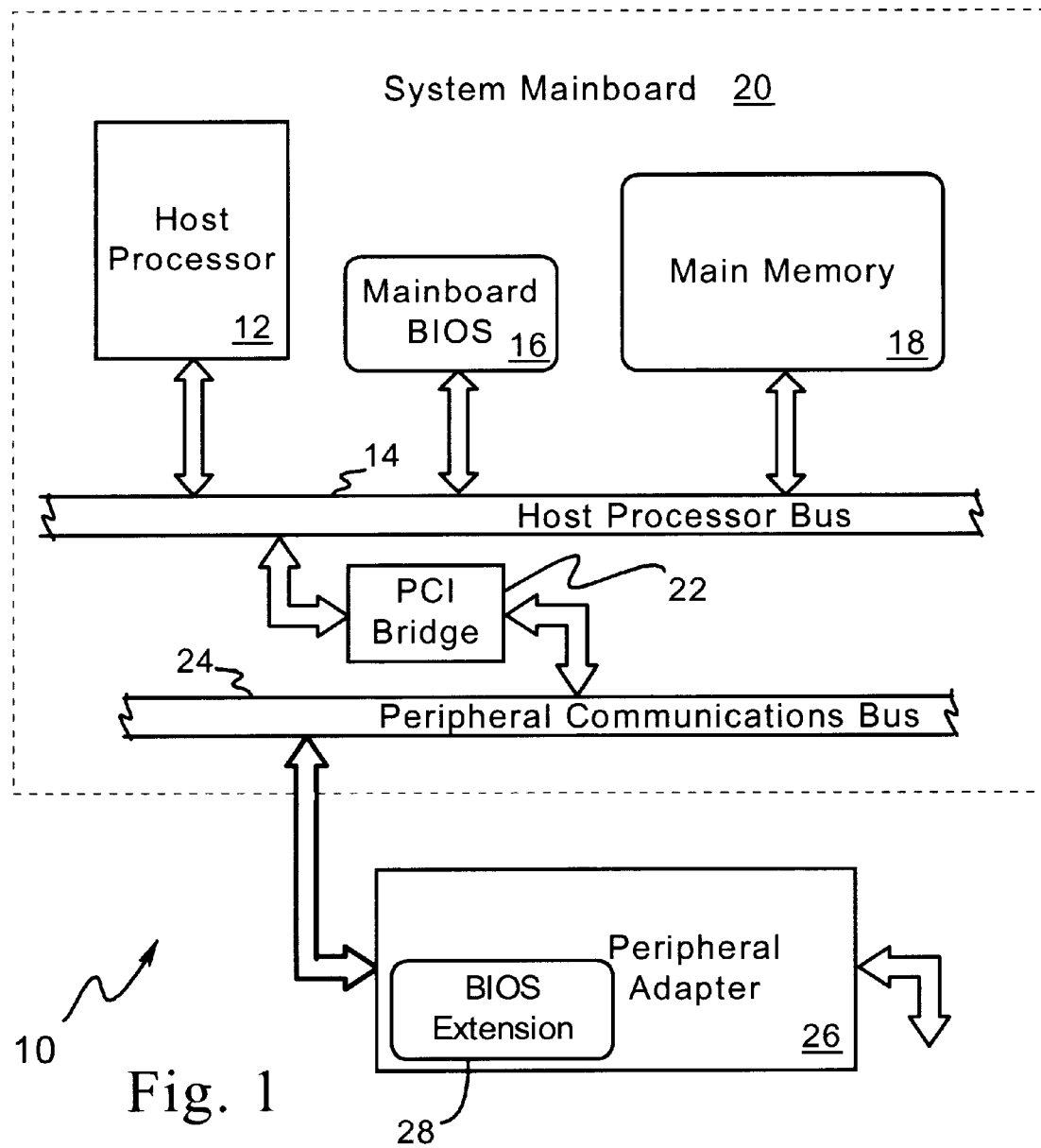
FIG. 1 is a block diagram of a computer system or workstation employing a peripheral interconnect bus to support a peripheral controller with on-board initialization firmware.

FIG. 1 provides a block diagram of a conventional computer system or workstation platform that incorporates a high performance peripheral communications bus that is used in a wide variety of personal computer systems and workstations. The system 10 includes a host processor 12 connected via a host processor bus 14 to a mainboard BIOS memory 16, and to a main memory array 18 provided, typically together on a processor mainboard.

Also typically on the processor mainboard 20 is a peripheral communications bus 24 that allows for the addition of peripheral adapters to the computer system 10. In a preferred embodiment, a PCI bridge circuit 22 serves to couple the PCI bus 24 to the host processor bus 14. The electrical definition of the PCI bus has been established as an industry standard as documented in the reports of the Peripheral Component Interconnect Special Interest Group s published by the Peripheral Component Interconnect Consortium, P.O. Box 14070, Portland, Oreg. 97293. The specification of the PCI bus functionally defines the implementation of the PCI bridge circuit 22. In effect, the PCI bridge circuit 22 provides a high-speed FIFO based a synchronous interconnection between the PCI bus 24 and host processor bus 14. Consequently, the PCI bus can operate at a single fixed clock frequency with either a 32-bit straight-through or 64-bit wide multiplexed data path between the PCI bus 24 the host processor bus 14. The PCI bridge circuit 26 also permits mapping control over the memory, I/O and interrupt space of peripheral PCI adapters relative to that of the host processor 12. This mapping is programmable under control of the host processor 12 and typically performed during system wide initialization through the execution of the initialization routines present in the mainboard BIOS 16.

A number of peripheral adapters, such as the PCI peripheral adaptor 26, can be coupled to the PCI bus 24 during the initial integration of the system 10 or subsequently as part of an OEM reconfiguration, field upgrade, or repair of the system 10. The peripheral adapter 26 includes a BIOS extension memory 28 that is used to store peripheral adapter specific software as selectively alterable or permanent firmware. The BIOS extension memory 28 may be realized as a Flash EEPROM, a standard EEPROM, a standard UV-EPROM, a one-time programmable PROM, a standard PROM, a ROM or any other programmable type of memory device.

Conventional versions of the BIOS extension 28 are aligned on memory page boundaries. A defined byte sequence of 0X55, 0AA is used as a nominal BIOS extension identifier. A simple search algorithm is conventionally utilized by the mainboard BIOS 16 to locate BIOS extensions such as the BIOS extension 28 located on peripheral adaptor 26. Generally, the search algorithm includes a sequential scan at memory page boundaries for a BIOS extension identifier in the first and second byte offset locations within the memory page. A variety of different confirming checks may then be made by the mainboard BIOS 16 to verify the proper existence of a BIOS extension 28 before a programmed jump is performed to a predefined initialization jump point destination within the BIOS extension 28. Execution of the initialization routine of the BIOS extension 28 then proceeds ultimately with a return of execution control to the mainboard BIOS 16.

In different computer systems and workstations, the particular set of verification checks performed may vary considerably with certainty that not all instances of a mainboard BIOS 16 or even an majority of like host computer manufacturers use the same series of checks performed in a similar order. Consequently, in conventional computer systems and workstations, a substantial likelihood exists that BIOS extensions 28 inappropriate for execution by a particular processor type will nonetheless be identified and execution attempted. Generally, the result is that the computer platform halts, typically with the execution of an invalid instruction. Consequently, there is a full functional failure of the computer platform that is unavoidable unless and until an appropriate BIOS extension 28 is provided and selected appropriately for a specific host processor 12.

In accordance with the present invention, multiple BIOS extension images may be placed within the BIOS extension 28 so as to provide a properly executable image for each different type of host processor 12 that the peripheral adaptor 26 may be used with. Specifically, in a preferred embodiment, two images are provided within the BIOS extension 28. A first extension image corresponds to an Intel family host processor with an IBM compatible mainboard BIOS 16. The second image provided corresponds to a PowerRPC type host processor with a Macintosh compatible mainboard BIOS 16. The Intel/IBM image preferably occupies the first 32K bytes of the BIOS extension 28 while the power PC/Macintosh image occupies a second 32K bytes within the BIOS extension 28.

Figure 2:
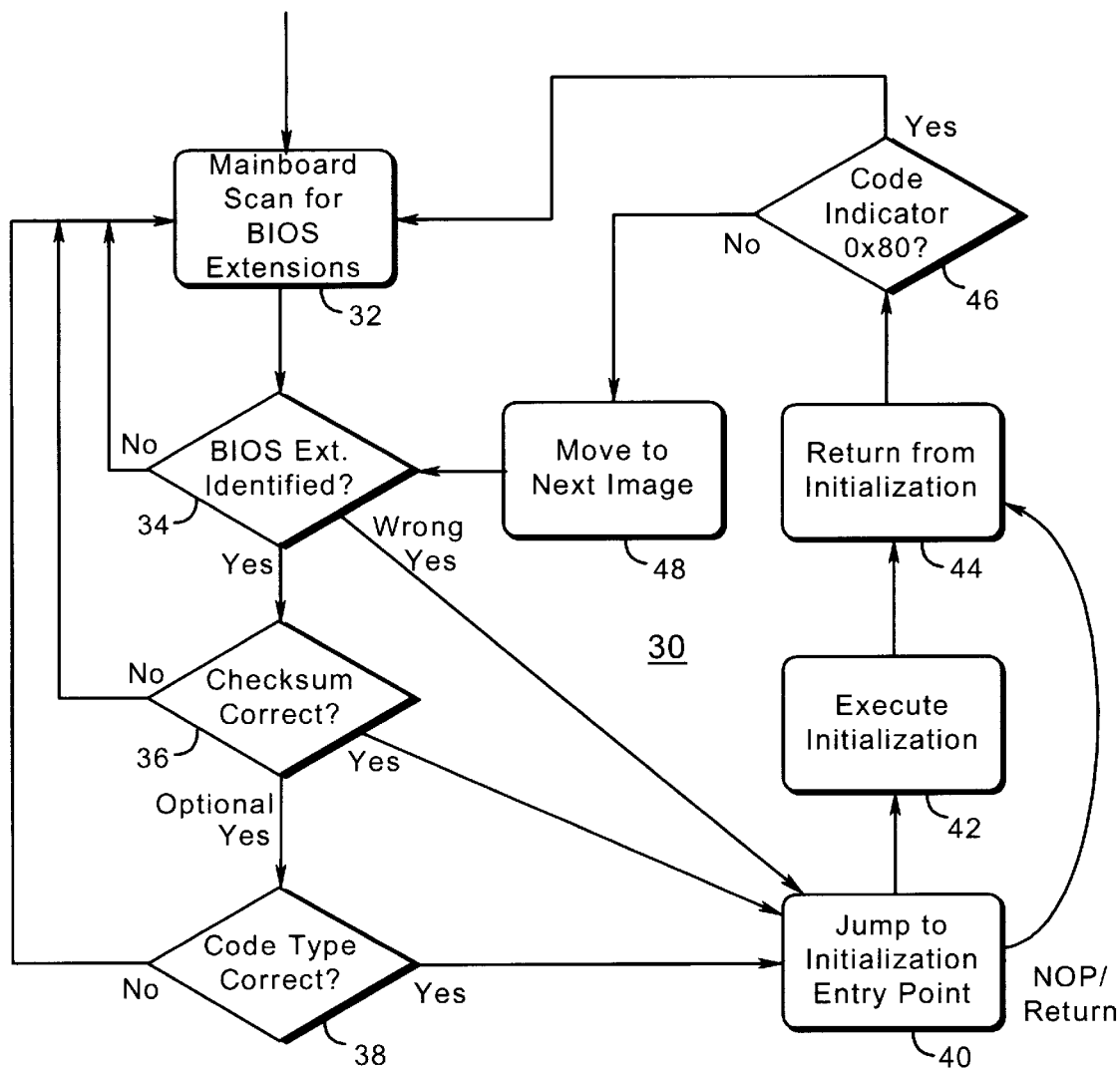
FIG. 2 is a flow diagram of a first BIOS extension image detection and selection process.

Considering first the intended operation of the mainboard BIOS 16 in correctly selecting and executing the initialization routine of the first BIOS extension image, reference is made to FIG. 2 and Table I.

TABLE I

Intel/IBM Identifiers and Markers

| Location | Value | Description | |
|---|---|---|---|
| 0 × 0 | 0 × 55 | Nominal BIOS extension identifier, byte 1 | |
| 0 × 1 | 0 × AA | Nominal BIOS extension identifier, byte 2 | |
| 0 × 2 | +++ | Page size of extension image | |
| 0 × 3 | +++ | Initialization jump point destination | |
| ... | ... | ... | |
| 0 × 18 | — | Beginning of PCI Data Structure | |
| 0 × 19 | — | N/A | |
| 0 × 20 | 0 × 00 | Code Type | Intel = 0 × 00; Power PC = 0 × 01 |
| 0 × 21 | 0 × 00 | Code Indicator | Last image = 0 × 80; All others = 0 × 00; |
| ... | ... | ... | |
| 0 × 7fff | +++ | Correct image checksum | |

"—" means value not significant.
"+++" means value set to appropriate hex value.
"****" means value set to inappropriate hex value.

In the conventional execution of the initialization routines of the mainboard BIOS 16, a mainboard scan for BIOS extensions 32 is performed. At each memory page boundary, the first two bytes are checked to determine the existence of a nominal BIOS extension indenifier. If the proper identifiers are not found, the mainboard scan for BIOS extensions 32 continues. Where the nominal BIOS extension identifier is found, the checksum is generally checked 36. If the checksum fails, the mainboard scan 32 continues.

If any correct checksum is found, a further check of the BIOS extension image code type 38 may be performed. The image code type is a hex value defined as residing at an offset 0×20 from the beginning of the correct image. This code type is defined by the PCI specification and identifies a value of 0×00 as corresponding to an Intel/IBM compatible system while a value of 0×01 is defined as corresponding to a PowerPC/MacIntosh system. This code type value is compared against a value stored generally on the mainboard of the system 10 in connection with the specific type of host processor 12 and mainboard BIOS 16. If the code type is not correct, the mainboard scan for BIOS extensions 32 continues.

Where the code type is determined to be correct or where the code type is not checked, the mainboard BIOS 16 performs a programmed execution jump to an initialization entry point within the first BIOS extension image 40. By the effective definition of IBM compatibility, this initialization entry point occurs at offset 0×3 from the beginning of the Intel/IBM BIOS extension image. The initialization routines are then executed 42. Execution control then returns 44 to the mainboard BIOS 16.

In accordance with the PCI specification, a code indicator bit is then checked 46 to determine whether multiple BIOS extension images are resident on the same peripheral adapter 26. The code indicator occurs as bit 7 within the byte at an offset of 0×21 from the beginning of the current image. The first and any intermediate images will have a code indicator of 0×00, while the last image will have the code indicator byte set to 0×80. If the code indicator byte is not 0×80, or more specifically bit 7 is not 1, the mainboard BIOS execution continues with an increment to the next 32K byte image boundary 48 where a check is then made for the existence of the nominal BIOS extension identifier 34. If the extension identifier is again found execution continues as before with a checksum check 36 of this next image.

Where the code indicator byte has a value of 0×80, the current image is determined to be the last on the peripheral adaptor 26 and mainboard BIOS execution continues with the scan for BIOS extensions 32.

Ultimately, the mainboard BIOS scan 32 exhausts the available memory space for peripheral adapters, terminates the scan, and continues on with the initialization of the system 10.

Figure 3:
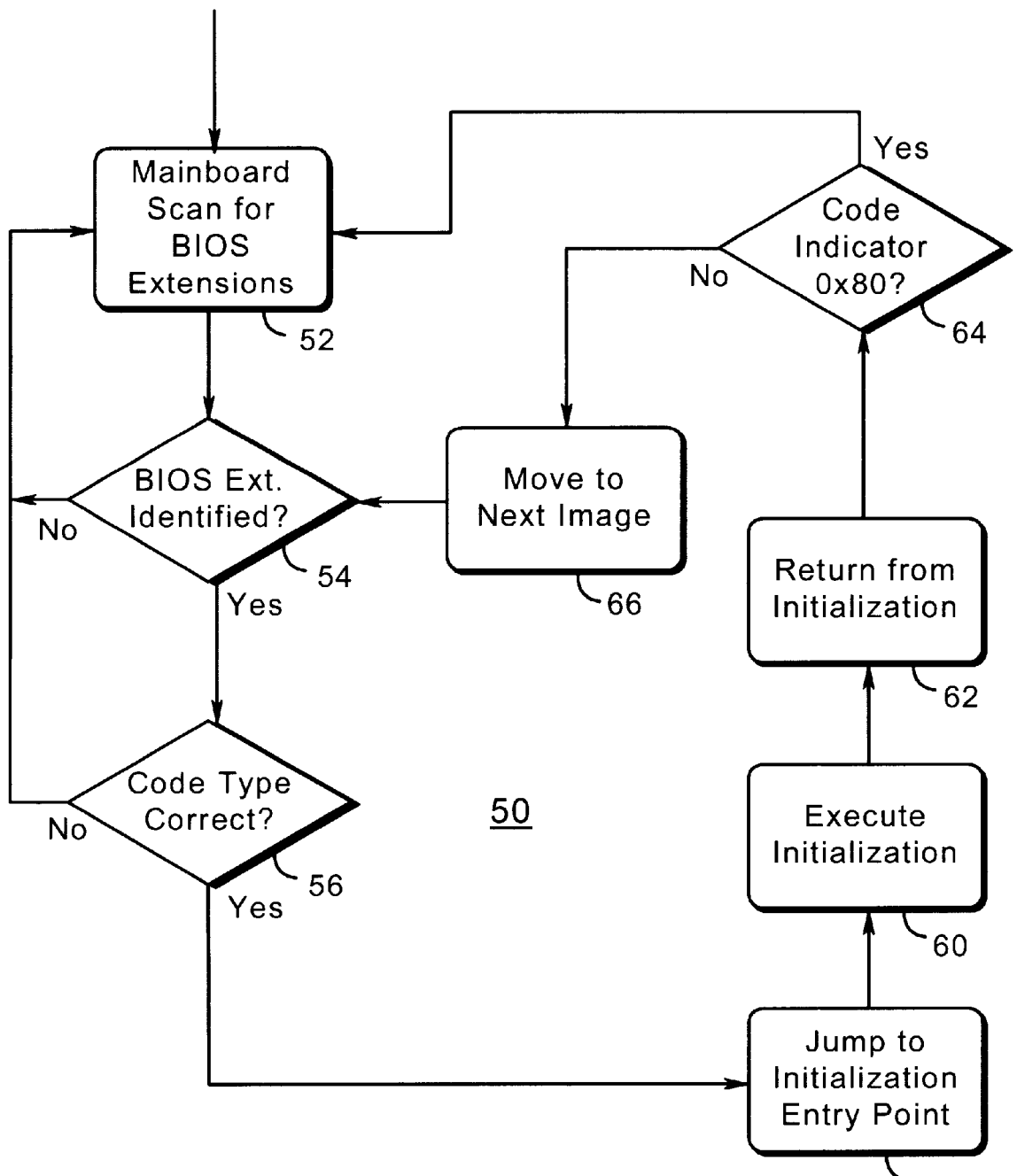
FIG. 3 is a flow diagram of a second BIOS extension image detection and selection process.

Referring now to FIG. 3 and Table II, a system 10 that utilizes a PowerPC host processor 12 and Macintosh compatible mainboard BIOS 16 is shown and described in relationship to the initialization of the peripheral adaptor 26.

The mainboard BIOS 16 again conventionally includes a mainboard scan for BIOS extensions 52 that examines selected memory page boundaries for the existence of a nominal BIOS extension identifier. If the BIOS extension identifier is not found in the first two bytes of a memory page 54, the mainboard scan for BIOS extensions 52 continues.

TABLE II

Power PC/Macintosh Identifiers and Markers

| Location | Value | Description | |
|---|---|---|---|
| 0 × 0 | 0 × 55 | Nominal BIOS extension identifier, byte 1 | |
| 0 × 1 | 0 × AA | Nominal BIOS extension identifier, byte 2 | |
| 0 × 2 | +++ | Page size of extension image | |
| 0 × 3 | 0 × 00 | Required byte value; use as dummy initialization jump point destination: Add CH, CL | |
| 0 × 4 | 0 × CD | Reserved byte location; value not used; use for second byte of Add instruction. | |
| 0 × 5 | 0 × CB | Reserved byte location; value not used; use for Immediate return; RETF | |
| ... | ... | ... | |
| 0 × 18 | — | Beginning of PCI Data Structure, N/A | |
| 0 × 19 | — | N/A | |
| 0 × 20 | 0 × 01 | Code Type | Intel = 0 × 00; Power PC = 0 × 01 |
| 0 × 21 | 0 × 80 | Code Indicator | Last image = 0 × 80; All others = 0 × 00. |
| ... | ... | ... | |
| 0 × 7fff | **** | Incorrect image checksum | |

"—" means value not significant.
"+++" means value set to appropriate hex value.
"****" means value set to incorrect hex value.

If the nominal BIOS extension identifier is validly found, then a code type check 56 is performed. Again, the code type identifier exists as defined by the PCI specification at an offset of 0×20 from the beginning of the current BIOS extension image. If a value of 0×01 is not found by the Macintosh mainboard BIOS 16, the mainboard scan for BIOS extensions 52 again continues.

If the code type is correct at offset 0×20, a programmed jump is then performed by the mainboard BIOS 16 to a predefined initialization execution entry point 58. The location of this initialization entry point 58 is determined as a consequence of utilizing a Macintosh compatible mainboard BIOS 16. The initialization routine within the BIOS extension image 28 is then executed 60. Following proper completion of the initialization, a programmed return 62 is performed to return execution control to the mainboard BIOS 16.

The code indicator bit within the byte located at offset 0×21 from the beginning of the current image is then checked to determine whether this is the final BIOS extension image within the BIOS extension 28. Where the code indicator bit identifies this image as the last image present in the BIOS extension 28, execution continues with the mainboard scan for BIOS extensions 52. If further images are indicated as being present in the BIOS extension 28, the image at the next 32K byte page boundary is selected 66 and examined to determine whether a nominal BIOS extension identifier exists 54. In both instances, execution of the mainboard BIOS 16 continues as before.

Ultimately, the mainboard scan for BIOS extensions 52 will exhaust the available address space for BIOS extensions. Consequently, the scan is then terminated and any remaining initialization operations defined by the mainboard BIOS 16 are then executed.

Returning to FIG. 2, a number of safeguards are implemented in accordance with the present invention to ensure that an IBM compatible BIOS 16 does not inadvertently attempt to execute a BIOS extension appropriate for a PowerPC/Macintosh System 50. A first safeguard is that the checksum of a Macintosh compatible BIOS extension image is intentionally provided with an incorrect checksum value for the image, as noted in Table II. Macintosh compatible BIOSs do not evidently derive the validity of an image by calculation of a checksum and comparison with the value stored at 0×7fff in the current image. Thus, the IBM compatible BIOS 16 checksum of a Macintosh compatible BIOS extension check 36 is guaranteed to fail.

A second safeguard is provided by ensuring PCI specification compliant use of the code type value to identify the correct type of host processor 12 that is to execute the current BIOS extension image. A detected comparison failure results in the BIOS extension image not being executed 38.

Finally, a third safeguard is provided for when an IBM compatible mainboard BIOS in fact does not check either the checksum or code type markers within the current image, but instead directly jumps to the initialization entry point 40 after only a nominal BIOS extension identifier has been found. In accordance with the present invention, a programmed jump to offset 0×3 into a Macintosh compatible extension image is by definition incorrect. Macintosh compatibility requires that the byte value at 0×3, a reserved byte location of unclear use, be 0×00. As recognized by the present invention, however, a byte value of 0×00 corresponds to the first byte of the Intel machine language instruction Add CH,CL. The CH and CL register values in an Intel type host processor 12 are not relied on by the mainboard BIOS 16 across the execution of the initialization routines 42 of an IBM compatible BIOS extension image 28. Consequently, the byte value 0×00 can be preserved at location 0×3 in a Macintosh compatible BIOS extension image as required for its proper execution while an effectively no operation instruction (NOP) is performed by an Intel type host processor 12 incorrectly jumping to the supposed initialization entry point of a Macintosh compatible extension image.

Also in accordance with the present invention, the hex value corresponding to the Intel type host processor 12 return from (RETF) instruction is stored at the offset location 0×4. By definition of the Macintosh mainboard BIOS compatibility offset 0×4 is a reserved byte location and is therefore unavailable for use. In fact, however, the reserved byte location 0×4 is not used in any identifiable way in connection with the execution of a Macintosh compatible BIOS extension image 28. Thus, use can be made of the location 0×4 to store the byte value of the RETF Intel machine instruction. Consequently, an inappropriate jump to initialization entry point 40 by an IBM mainboard BIOS 16 within a Macintosh BIOS extension image results in the execution of a NOP followed by a return from initialization 44. The execution of the two bytes at locations 0×3 and 0×4 are sufficiently limited and controlled that upon incorrect identification of a Macintosh BIOS extension image 28, execution of any invalid instruction is prevented. Legacy IBM compatible BIOSs that fail to provide sufficient processor type validation checks of a BIOS extension image still manages to operate correctly with use of the present invention. Indeed, where a legacy IBM compatible BIOS even fails to check the code indicator bit 64 in accordance with the PCI specification, by placing the IBM BIOS extension image as the first image within the BIOS extension 28, the mainboard scan for extension 52 will still continue and likely discover any subsequent images within the BIOS extension 28.

Conversely, the Macintosh compatible mainboard BIOS 16 is apparently sufficiently standardized to be relied on to check for both a nominal BIOS extension identifier 54 and code type 56 of any found BIOS extension image. As a result, a Macintosh mainboard BIOS 16 will not attempt to execute an IBM compatible BIOS extension image 28.

Thus, a system and method of providing for the correct identification of a peripheral adapter BIOS extension image has been described. While the present invention has been described particularly with reference to Intel/IBM and PowerPC/MacIntosh computer systems and workstations utilizing the PCI bus, the present invention is equally applicable to other processor types and mainboard compatible BIOSs.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

We claim:

1. A system supporting the selection between multiple images of a BIOS extension provided on a peripheral adapter for use in initialization of said peripheral adapter by a host computer specific to the processor type employed by said host computer, said system comprising:

a) a peripheral adapter; and
   b) a BIOS extension provided on said peripheral adapter including a plurality of BIOS extension variant images that are separately executable by either a first or a second host computer that potentially employ different types of processors to perform peripheral adapter BIOS extension location and execution of an initialization routine provided within said variant images, at least one of said variant images including a nominal identifier of a BIOS extension and a firmware marker compliant with the location and execution of a predetermined legacy BIOS extension by said first host computer and that is distinguished by said second host computer as defining an unusable BIOS extension.

2. The system of claim 1 wherein said peripheral adapter card implements a PCI-type peripheral adapter interconnect bus.

3. The system of claim 1 wherein said peripheral adapter requires no hardware additions or modifications specific to enabling said first and second host computers to uniquely locate and execute said initialization routines of said variant images of said BIOS extension.

4. The system of claim 1, 2, or 3 wherein each of said variant images includes said nominal identifier and wherein each of said variant images includes a functionally complementary instance of said firmware marker, such that said plurality of variant images are executable for initialization of said peripheral adapter only by respective ones of said first and second host computers.

5. The system of claim 4 wherein a predetermined one of said variant images includes an execution return path that prevents execution of said initialization routine within a predetermined one of said variant images by a predetermined one of said first and second host computers.

6. A system that supports the selection of a predetermined BIOS extension image for use in initializing a peripheral adapter; said system comprising:

a) a peripheral adapter; and b) a firmware image of a BIOS extension that is storable on said peripheral adapter, said firmware image including a nominal identifier of a BIOS extension and a set of one or more firmware markers included with said firmware image that are compliant with the valid identification of said BIOS extension by a first predetermined host computer and that ensures that said firmware image is identifiable by a second predetermined host computer as being invalid.

7. The system of claim 6 wherein said set of firmware markers are usable exclusively to uniquely enable a predetermined one of said first and second predetermined host computers to appropriately execute said BIOS extension.

8. The system of claim 6 wherein said set of firmware markers within said firmware image are sufficient to exclusively identify that said BIOS extension is valid for execution by said first predetermined host computer and invalid or ineffective upon initial execution by said second predetermined host computer.

* * * * *